United States Patent
MacLeod et al.

(10) Patent No.: US 9,460,303 B2
(45) Date of Patent: Oct. 4, 2016

(54) OPERATING LARGE SCALE SYSTEMS AND CLOUD SERVICES WITH ZERO-STANDING ELEVATED PERMISSIONS

(75) Inventors: Alexander MacLeod, Seattle, WA (US); Andrey Lukyanov, Redmond, WA (US); Colin Nash, Mill Creek, WA (US); Jaskaran Singh, Redmond, WA (US); Rajmohan Rajagopalan, Redmond, WA (US); Vivek Sharma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/413,078

(22) Filed: Mar. 6, 2012

(65) Prior Publication Data

US 2013/0239166 A1    Sep. 12, 2013

(51) Int. Cl.
  *G06F 17/30*    (2006.01)
  *G06F 21/62*    (2013.01)
  *G06Q 10/06*    (2012.01)
  *G06F 21/60*    (2013.01)

(52) U.S. Cl.
  CPC ......... *G06F 21/6218* (2013.01); *G06F 21/604* (2013.01); *G06Q 10/06* (2013.01)

(58) Field of Classification Search
  None
  See application file for complete search history.

(56) References Cited

U.S. PATENT DOCUMENTS

| | | | |
|---|---|---|---|
| 5,423,044 A * | 6/1995 | Sutton | G06F 9/52 710/200 |
| 5,564,016 A | 10/1996 | Korenshtein | |
| 5,911,143 A | 6/1999 | Deinhart et al. | |
| 6,151,643 A | 11/2000 | Cheng et al. | |
| 6,335,972 B1 | 1/2002 | Chandersekaran et al. | |
| 6,510,513 B1 * | 1/2003 | Danieli | G06F 21/64 380/279 |
| 6,526,513 B1 * | 2/2003 | Shrader | G06F 21/52 719/315 |
| 6,678,826 B1 * | 1/2004 | Kelly et al. | 726/2 |
| 6,694,437 B1 | 2/2004 | Pao et al. | |
| 6,804,773 B1 | 10/2004 | Grigsby et al. | |
| 6,978,367 B1 | 12/2005 | Hind et al. | |
| 7,205,883 B2 | 4/2007 | Bailey | |
| 7,257,713 B2 | 8/2007 | Colvig et al. | |
| 7,426,654 B2 | 9/2008 | Adams, Jr. et al. | |
| 7,496,191 B1 * | 2/2009 | Crews | G06F 21/6218 379/142.02 |
| 7,506,364 B2 * | 3/2009 | Vayman | G06F 21/57 726/1 |
| 7,526,685 B2 | 4/2009 | Noy et al. | |

(Continued)

FOREIGN PATENT DOCUMENTS

CN    1794717 A  *  6/2006

OTHER PUBLICATIONS

Yu, "Data Security in Cloud Computing", 2012, Morgan Kaufmann/Elsevier, book section 15, pp. 389-410.*

(Continued)

*Primary Examiner* — Andrew Nalven
*Assistant Examiner* — Walter Malinowski
(74) *Attorney, Agent, or Firm* — Tom Wong; Damon Rieth; Micky Minhas

(57) ABSTRACT

Large scale system operation may be provided. Upon receiving an action request from a user, a determination may be made as to whether the user requires elevated permissions to perform the action request. In response to determining that the user requires elevated permissions to perform the action request, the action request may be forwarded to a lockbox for evaluation and a permission response may be received from the lockbox.

20 Claims, 3 Drawing Sheets

(56) References Cited

U.S. PATENT DOCUMENTS

| | | | |
|---|---|---|---|
| 7,607,164 B2* | 10/2009 | Vasishth | G06F 21/577 709/223 |
| 7,630,480 B2 | 12/2009 | Fleck et al. | |
| 7,644,285 B1 | 1/2010 | Murray et al. | |
| 7,680,822 B1 | 3/2010 | Vyas et al. | |
| 7,698,430 B2 | 4/2010 | Jackson | |
| 7,702,736 B2 | 4/2010 | Ouchi | |
| 7,734,670 B2 | 6/2010 | Poozhiyil et al. | |
| 7,815,106 B1 | 10/2010 | McConnell | |
| 7,831,833 B2 | 11/2010 | Gaylor | |
| 7,950,051 B1 | 5/2011 | Spitz et al. | |
| 7,992,008 B2 | 8/2011 | Ashok et al. | |
| 8,046,558 B2 | 10/2011 | Ghose | |
| 8,195,488 B1 | 6/2012 | Taix et al. | |
| 8,201,224 B1 | 6/2012 | Spertus | |
| 8,244,549 B1* | 8/2012 | Stener | G06Q 10/02 705/1.1 |
| 8,296,827 B2 | 10/2012 | Paganetti et al. | |
| 8,310,923 B1 | 11/2012 | Nordstrom et al. | |
| 8,312,516 B1* | 11/2012 | Malatesta | G06F 21/6218 707/783 |
| 8,438,647 B2 | 5/2013 | Jevans | |
| 8,458,455 B2 | 6/2013 | Anderson et al. | |
| 8,458,779 B2 | 6/2013 | Valentine et al. | |
| 8,793,790 B2 | 7/2014 | Khurana et al. | |
| 8,839,257 B2* | 9/2014 | Lukyanov | G06F 21/52 709/225 |
| 8,881,249 B2* | 11/2014 | Nunn | G06F 21/45 713/182 |
| 9,105,009 B2* | 8/2015 | MacLeod | G06Q 10/107 |
| 2001/0021926 A1* | 9/2001 | Schneck et al. | 705/54 |
| 2002/0026592 A1 | 2/2002 | Gavrila et al. | |
| 2002/0035521 A1* | 3/2002 | Powers | 705/28 |
| 2002/0147801 A1 | 10/2002 | Gullotta et al. | |
| 2003/0037251 A1 | 2/2003 | Frieder et al. | |
| 2003/0088786 A1* | 5/2003 | Moran | G06F 21/6218 726/4 |
| 2003/0115148 A1 | 6/2003 | Takhar | 705/64 |
| 2003/0139962 A1 | 7/2003 | Nobrega et al. | |
| 2004/0088295 A1* | 5/2004 | Glazer | G06F 21/604 |
| 2004/0205342 A1* | 10/2004 | Roegner | G06F 21/6218 713/168 |
| 2004/0230530 A1 | 11/2004 | Searl et al. | |
| 2005/0050354 A1* | 3/2005 | Gociman | 713/201 |
| 2005/0154744 A1 | 7/2005 | Morinville | |
| 2005/0180573 A1* | 8/2005 | Pelly et al. | 380/277 |
| 2005/0193041 A1 | 9/2005 | Bourbonnais et al. | |
| 2005/0204143 A1* | 9/2005 | Ellington | 713/182 |
| 2006/0005048 A1 | 1/2006 | Osaki et al. | |
| 2006/0048224 A1* | 3/2006 | Duncan et al. | 726/22 |
| 2006/0075144 A1 | 4/2006 | Challener et al. | |
| 2006/0075464 A1* | 4/2006 | Golan | G06F 21/604 726/1 |
| 2006/0137007 A1* | 6/2006 | Paatero et al. | 726/22 |
| 2006/0168079 A1 | 7/2006 | Shen et al. | |
| 2006/0184675 A1 | 8/2006 | Salmre et al. | |
| 2006/0242690 A1 | 10/2006 | Wolf et al. | |
| 2006/0265599 A1* | 11/2006 | Kanai | 713/182 |
| 2007/0028293 A1 | 2/2007 | Boerries et al. | |
| 2007/0083928 A1 | 4/2007 | Mattsson et al. | |
| 2007/0094334 A1 | 4/2007 | Hoffman et al. | |
| 2007/0101434 A1 | 5/2007 | Jevans | |
| 2007/0124361 A1 | 5/2007 | Lowry et al. | |
| 2007/0143851 A1* | 6/2007 | Nicodemus et al. | 726/25 |
| 2007/0180100 A1* | 8/2007 | Biggs | G06F 21/554 709/224 |
| 2007/0185875 A1* | 8/2007 | Chang et al. | 707/9 |
| 2007/0192416 A1 | 8/2007 | Gupta | |
| 2007/0244899 A1* | 10/2007 | Faitelson | G06F 21/604 |
| 2007/0250920 A1* | 10/2007 | Lindsay | 726/7 |
| 2007/0266006 A1* | 11/2007 | Buss | G06F 21/6227 |
| 2007/0289019 A1* | 12/2007 | Lowrey | 726/24 |
| 2007/0294258 A1 | 12/2007 | Caldwell et al. | |
| 2008/0098485 A1 | 4/2008 | Chiou | |
| 2008/0103916 A1* | 5/2008 | Camarador et al. | 705/26 |
| 2008/0123854 A1 | 5/2008 | Peel et al. | |
| 2008/0127354 A1* | 5/2008 | Carpenter | G06F 21/6209 726/28 |
| 2008/0140778 A1 | 6/2008 | Banavar et al. | |
| 2008/0154774 A1* | 6/2008 | Dennison et al. | 705/51 |
| 2008/0155685 A1* | 6/2008 | Beilinson | G06F 21/604 726/21 |
| 2008/0168532 A1* | 7/2008 | Carter et al. | 726/1 |
| 2008/0195936 A1 | 8/2008 | White et al. | |
| 2008/0222734 A1 | 9/2008 | Redlich et al. | |
| 2008/0276098 A1 | 11/2008 | Florencio et al. | |
| 2008/0287121 A1* | 11/2008 | Ebrom et al. | 709/201 |
| 2008/0320310 A1 | 12/2008 | Florencio et al. | |
| 2009/0048881 A1 | 2/2009 | Keane et al. | |
| 2009/0055822 A1 | 2/2009 | Tolman et al. | |
| 2009/0094667 A1 | 4/2009 | Habeck et al. | |
| 2009/0104888 A1 | 4/2009 | Cox | |
| 2009/0119541 A1 | 5/2009 | Inoue et al. | |
| 2009/0193407 A1* | 7/2009 | Lepeska | 717/170 |
| 2009/0210427 A1* | 8/2009 | Eidler et al. | 707/10 |
| 2009/0249284 A1 | 10/2009 | Antosz et al. | |
| 2009/0271451 A1 | 10/2009 | Young et al. | |
| 2009/0319402 A1 | 12/2009 | Manista et al. | |
| 2009/0320088 A1* | 12/2009 | Gill et al. | 726/1 |
| 2009/0320107 A1 | 12/2009 | Corella | |
| 2009/0328023 A1 | 12/2009 | Bestland et al. | |
| 2010/0005510 A1 | 1/2010 | Weber et al. | |
| 2010/0011418 A1* | 1/2010 | Despain et al. | 726/4 |
| 2010/0017589 A1 | 1/2010 | Reed et al. | |
| 2010/0023368 A1 | 1/2010 | Houba | |
| 2010/0031058 A1 | 2/2010 | Kito et al. | |
| 2010/0037056 A1 | 2/2010 | Follis et al. | |
| 2010/0063950 A1* | 3/2010 | Joshi et al. | 706/45 |
| 2010/0064072 A1 | 3/2010 | Tang et al. | |
| 2010/0087941 A1 | 4/2010 | Assaf et al. | |
| 2010/0091318 A1 | 4/2010 | Ferlitsch | |
| 2010/0169630 A1 | 7/2010 | Mirashrafi et al. | |
| 2010/0185451 A1* | 7/2010 | Choi et al. | 705/1.1 |
| 2010/0188287 A1 | 7/2010 | Madsen et al. | |
| 2010/0205421 A1 | 8/2010 | Campbell et al. | |
| 2010/0212008 A1* | 8/2010 | Jaganathan et al. | 726/19 |
| 2010/0218012 A1 | 8/2010 | Joseph et al. | |
| 2010/0242041 A1 | 9/2010 | Plondke et al. | |
| 2010/0250939 A1 | 9/2010 | Adams et al. | |
| 2010/0257346 A1 | 10/2010 | Sosnosky et al. | |
| 2010/0257579 A1* | 10/2010 | Karjoth et al. | 726/1 |
| 2010/0257596 A1 | 10/2010 | Ngo et al. | |
| 2010/0278078 A1 | 11/2010 | Proulx et al. | |
| 2010/0281546 A1 | 11/2010 | Kruse et al. | |
| 2010/0287597 A1* | 11/2010 | Richins | G06F 21/604 726/1 |
| 2011/0023107 A1 | 1/2011 | Chen et al. | |
| 2011/0061093 A1* | 3/2011 | Korkus et al. | 726/4 |
| 2011/0078497 A1 | 3/2011 | Lyne et al. | |
| 2011/0099202 A1* | 4/2011 | Dedeoglu | G06F 17/30702 707/780 |
| 2011/0099552 A1 | 4/2011 | Avni et al. | |
| 2011/0099616 A1 | 4/2011 | Mazur et al. | |
| 2011/0126111 A1* | 5/2011 | Gill et al. | 715/736 |
| 2011/0191254 A1 | 8/2011 | Womack | |
| 2011/0191485 A1* | 8/2011 | Umbehocker | 709/229 |
| 2011/0209194 A1* | 8/2011 | Kennedy | 726/1 |
| 2011/0246426 A1 | 10/2011 | Cho | |
| 2011/0247066 A1* | 10/2011 | Lee | 726/19 |
| 2011/0252404 A1* | 10/2011 | Park et al. | 717/124 |
| 2011/0277017 A1* | 11/2011 | Ivanov et al. | 726/4 |
| 2011/0289588 A1 | 11/2011 | Sahai et al. | |
| 2011/0302632 A1* | 12/2011 | Garrett et al. | 726/4 |
| 2012/0016621 A1* | 1/2012 | Tan et al. | 702/122 |
| 2012/0096306 A1 | 4/2012 | Akirav et al. | |
| 2012/0110055 A1 | 5/2012 | Van Biljon et al. | 709/201 |
| 2012/0137360 A1 | 5/2012 | Henderson | 726/17 |
| 2012/0144234 A1 | 6/2012 | Clark et al. | |
| 2012/0185911 A1* | 7/2012 | Polite et al. | 726/1 |
| 2012/0185933 A1 | 7/2012 | Belk et al. | |
| 2012/0209884 A1* | 8/2012 | Mattsson et al. | 707/783 |
| 2012/0239822 A1 | 9/2012 | Poulson et al. | |
| 2012/0246703 A1 | 9/2012 | MacLeod | G06Q 10/107 726/4 |

(56) References Cited

U.S. PATENT DOCUMENTS

| | | | |
|---|---|---|---|
| 2012/0259720 A1 | 10/2012 | Nuzzi | |
| 2012/0266246 A1* | 10/2012 | Amit et al. | 726/25 |
| 2012/0317132 A1* | 12/2012 | Brady | G06Q 10/06 707/769 |
| 2013/0024918 A1 | 1/2013 | Cramer et al. | |
| 2013/0024947 A1 | 1/2013 | Holland et al. | |
| 2013/0031070 A1* | 1/2013 | Ducharme et al. | 707/705 |
| 2013/0111260 A1 | 5/2013 | Reddy et al. | |
| 2013/0132963 A1* | 5/2013 | Lukyanov | G06F 21/52 718/103 |
| 2013/0133024 A1* | 5/2013 | MacLeod | G06F 21/6218 726/1 |
| 2014/0165167 A1 | 6/2014 | Nunn et al. | |

OTHER PUBLICATIONS

Davis, "Using roles to secure your VMWare ESX Infrastructure", <htt;://www.virtualizationadmin.com/articles-tutorials/vmware-esx-and-vsphere-articles/general/using-roles-ecure-vmware-esx-instrastructure.html>, Jul. 14, 2009, 9 pages.*
U.S. Appl. No. 13/712,688, filed Dec. 12, 2012, entitled "Scalable and Automated Secret Management".
U.S. Official Action dated Nov. 30, 2012 in U.S. Appl. No. 13/052,788.
U.S. Official Action dated Nov. 1, 2012 in U.S. Appl. No. 13/154,660.
U.S. Official Action dated Jan. 14, 2013 in U.S. Appl. No. 13/301,872.
Batishchev, Alexander M., "Getting Elevated Privileges on Demand using C#", Published on: Sep. 9, 2010, Available at: http://www.codeproject.com/KB/vista-security/ElevatedPrivilegesDemand.aspx.
U.S. Appl. No. 13/052,788, filed Mar. 21, 2011, entitled "Email-Based Automated Recovery Action in a Hosted Environment".
U.S. Appl. No. 13/154,660, filed Jun. 7, 2011, entitled "Instance-Based Command Execution, Approval, and Notification Framework".
U.S. Appl. No. 13/301,872, filed Nov. 22, 2011, entitled "Auto-Approval of Recovery Actions Based on an Extensible Set of Conditions and Policies".
U.S. Appl. No. 13/302,064, filed Nov. 22, 2011, entitled "Superseding of Recovery Actions Based on Aggregation of Requests for Automated Sequencing and Cancellation".
Huhns, M., et al.; "Service-Oriented Computing: Key Concepts and Principles"; IEEE Internet Computing Jan./Feb. 2005, IEEE Computer Society; 7 pages.
Wright, T.; "System Center Service Manager 2010 Release Candidate Released!!"; Microsoft Corporation; Mar. 3, 2010; 3 pages.
Kaufman, Charlie, et al.; "Windows Azure ™Security Overview"; Published Aug. 2010; 24 pgs., Obtained at: http://www.globalfoundationservices.com/security/documents/WindowsAzureSecurityOverview1_0Aug2010.pdf.
Publication entitled, "PCI DSS Compliance in the UNIX/LINUX Datacenter Environment"; Published Aug. 2009 by BeyondTrust Corporation; 19 pages. Obtained at: http://i.zdnet.com/whitepapers/BeyondTrust_PCIDSSComplianceintheUNIXLinuxDatacenterEnvironment.pdf.
Master Data Services Environment—Retrieved Date: Oct. 4, 2011, Available at: http://download.microsoft.com/download/5/9/F/59F1639E-EF57-4915-8848-EF1DC2157EBB/02%20MDS%20Environment.pdf.
Stanger, Mark; article entitled "Change Management Workflow Approval Scripts in Service-now.com" Published on Oct. 20, 2010. Available at: http://www.servicenowguru.com/scripting/change-management-workflow-approval-scripts-servicenowcom/.
"IBM Tivoli Business Continuity Process Manager"—Retrieved Date: Oct. 4, 2011. Available at: http://www-01.ibm.com/software/tivoli/products/business-continuity-process-mgr/features.html.

"Deployment Planning, Architecture, and Guidance on System Center Service Manager"—Retrieved Date: Oct. 4, 2011. Available at: http://technet.microsoft.com/en-us/library/gg281359.aspx.
"Change Management Process" Version 1.0—Published Date: May 1, 2006. Available at: http://its.uncg.edu/Service_Management/Changer/ChangeManagementProcess.pdf.
Kadar, et al, article entitled "Automatic Classification of Change Requests for Improved IT Service Quality"— Published Date: Mar. 29, 2011. In proceedings of Annual SRII Global Conference, Mar. 29, 2011, pp. 430-439. Available at: http://ieeexplore.ieee.org/stamp/stamp.jsp?tp=arnumber=5958118.
"Automating IT: SCSM, SCCM, SCOM, SCVMM, Opalis—Better Together"—Retrieved Date: Oct. 3, 2011. Available at: http://blogs.technet.com/b/servicemanager/archive/2010/08/25/automating-it-scsm-sccm-scom-scvmm-opalis-better-together.aspx.
"BMC Remedy Change Management 7.0 User's Guide"—Published Date: Jun. 2006; 410 pages. Available at: http://idbdocs.iadb.org/wsdocs/getdocument.aspx?docnum=35595995.
U.S. Office Action dated May 2, 2013 in U.S. Appl. No. 13/154,660.
Chun-Ying Huang et al., Using one-time passwords to prevent password phishing attacks. J Network Computer Applications (2011), doi:10.1016/j.jnca. 2011.02.004.
Dinei Florencio et al., One-Time Password Access to Any Server without Changing the Server , 11th International conference on Information Security '08, Taipei. Sep. 15, 2008.
Joseph Bonneau et al., The Quest to Replace Passwords: A Framework for Comparative Evaluation of Web Authentication Schemes, IEEE Symposium on Security and Privacy (SP), 2012, May 20, 2012.
Lockbox. Printed Nov. 20, 2012. Lockbox: Technology Platform, 3 pgs. http://www.lock-box.com/technology-platform/.
Stoneware. Printed Nov. 21, 2012. Single Sign-on, 3 pgs. http://www.stone-ware.com/webnetwork/lenovo/sso.
U.S. Final Office Action dated Jul. 2, 2013 in U.S. Appl. No. 13/052,788, 27 pgs.
U.S. Office Action dated Sep. 30, 2013 in U.S. Appl. No. 13/154,660 26 pgs.
U.S. Final Office Action dated Sep. 30, 2013 in U.S. Appl. No. 13/301,872, 49 pgs.
U.S. Final Office Action dated Mar. 24, 2014 in U.S. Appl. No. 13/154,660, 31 pgs.
U.S. Office Action dated Dec. 17, 2013 in U.S. Appl. No. 13/052,788, 23 pgs.
U.S. Office Action dated Dec. 18, 2013 in U.S. Appl. No. 13/712,688, 33 pgs.
U.S. Office Action dated Jan. 30, 2014 in U.S. Appl. No. 13/302,064, 49 pgs.
U.S. Office Action dated Apr. 22, 2014 in U.S. Appl. No. 13/301,872, 56 pgs.
U.S. Final Office Action dated May 20, 2014 in U.S. Appl. No. 13/052,788, 35 pgs.
U.S. Final Office Action dated Aug. 27, 2014 in U.S. App. No. 13/301,872, 55 pgs.
U.S. Office Action dated Sep. 8, 2014 in U.S. Appl. No. 13/154,660, 36 pgs.
U.S. Office Action dated Sep. 9, 2014 in U.S. Appl. No. 13/052,788, 34 pgs.
U.S. Final Office Action dated Dec. 22, 2014 in U.S. Appl. No. 13/052,788, 30 pgs.
U.S. Final Office Action dated Jun. 25, 2015 in U.S. Appl. No. 13/301,872, 54 pgs.
U.S. Final Office Action dated Mar. 25, 2015 in U.S. Appl. No. 13/154,660, 33 pgs.
Notice of Allowance dated Apr. 1, 2015 in U.S. Appl. No. 13/052,788, 12 pgs.
Chinese Office Action, in application 2012100751745 mailed Mar. 3, 2016, 13 pgs.
U.S. Office Action dated Oct. 1, 2015 cited in U.S. Appl. No. 13/154,660, 24 pgs.
U.S. Office Action dated Nov. 6, 2015 cited in U.S. Appl. No. 13/301,872, 42 pgs.
U.S. Office Action dated Mar. 24, 2016 cited in U.S. Appl. No. 13/154,660, 26 pgs.

(56) References Cited

OTHER PUBLICATIONS

Amendment filed Mar. 4, 2014 in U.S. Appl. No. 13/302,064, 14 pgs.
Amendment filed Jan. 31, 2013 in U.S. Appl. No. 13/154,660, 14 pgs.
Amendment with Rce filed Aug. 2, 2013 in U.S. Appl. No. 13/154,660, 12 pgs.
Amendment filed Dec. 18, 2013 in U.S. Appl. No. 13/154,660, 11 pgs.
Amendment with RCE filed Jun. 24, 2014 in U.S. Appl. No. 13/154,660, 12 pgs.
Amendment with EOT filed Jan. 8, 2015 in U.S. Appl. No. 13/154,660, 16 pgs.
Response filed Jan. 4, 2016 in U.S. Appl. No. 13/154,660, 11 pgs.
Amendment filed Apr. 15, 2013 in U.S. Appl. No. 13/301,872, 14 pgs.
Amendment filed Aug. 28, 2015 in U.S. Appl. No. 13/301,872, 17 pgs.
Amendment filed Jul. 21, 2014 in U.S. Appl. No. 13/301,872, 14 pgs.
Amendment with RCE filed Dec. 30, 2013 in U.S. Appl. No. 13/301,872, 16 pgs.
Amendment with RCE filed Jan. 26, 2015 in U.S. Appl. No. 13/301,872, 22 pgs.
Amendment filed Dec. 9, 2014 in U.S. Appl. No. 13/052,788, 13 pgs.
Amendment filed Feb. 28, 2013 in U.S. Appl. No.13/052,788, 13 pgs.
Amendment filed Mar. 17, 2014 in U.S. Appl. No. 13/052,788, 12 pgs.
Amendment with RCE filed Aug. 19, 2014 in U.S. Appl. No. 13/052,788, 13 pgs.
Amendment with RCE filed Mar. 23, 2015 in U.S. Appl. No. 13/052,788, 15 pgs.
Amendment with RCE filed Oct. 2, 2013 in U.S. Appl. No. 13/052,788, 10 pgs.
Amendment filed Jul. 17, 2014 in U.S. Appl. No. 13/712,688, 6 pgs.
Amendment filed Mar. 18, 2014 in U.S. Appl. No. 13/712,688, 12 pgs.

* cited by examiner

OPERATING LARGE SCALE SYSTEMS AND CLOUD SERVICES WITH ZERO-STANDING ELEVATED PERMISSIONS

RELATED APPLICATION

Related U.S. patent application Ser. No. 13/052,788 (now U.S. Pat. No. 9,105,009), filed on Mar. 21, 2011 and entitled "Email-Based Automated Recovery Action in a Hosted Environment," assigned to the assignee of the present application, is hereby incorporated by reference.

BACKGROUND

Large scale system operation may be provided. Security and privacy are primary concerns Software as a Service (SaaS) systems. Customers want service providers to operate with a very low human touch and a minimum number of operators and engineers with potential access to customer data. Conventional approaches for this problem are to segregate access and ensure that users who need full administrator access have gone through complete background clearance. Such approaches must also assume good intentions on the part of those users, who are provided standing persistent permissions.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Large scale system operation may be provided. Upon receiving an action request from a user, a determination may be made as to whether the user requires elevated permissions to perform the action request. In response to determining that the user requires elevated permissions to perform the action request, the action request may be forwarded to a lockbox for evaluation and a permission response may be received from the lockbox.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
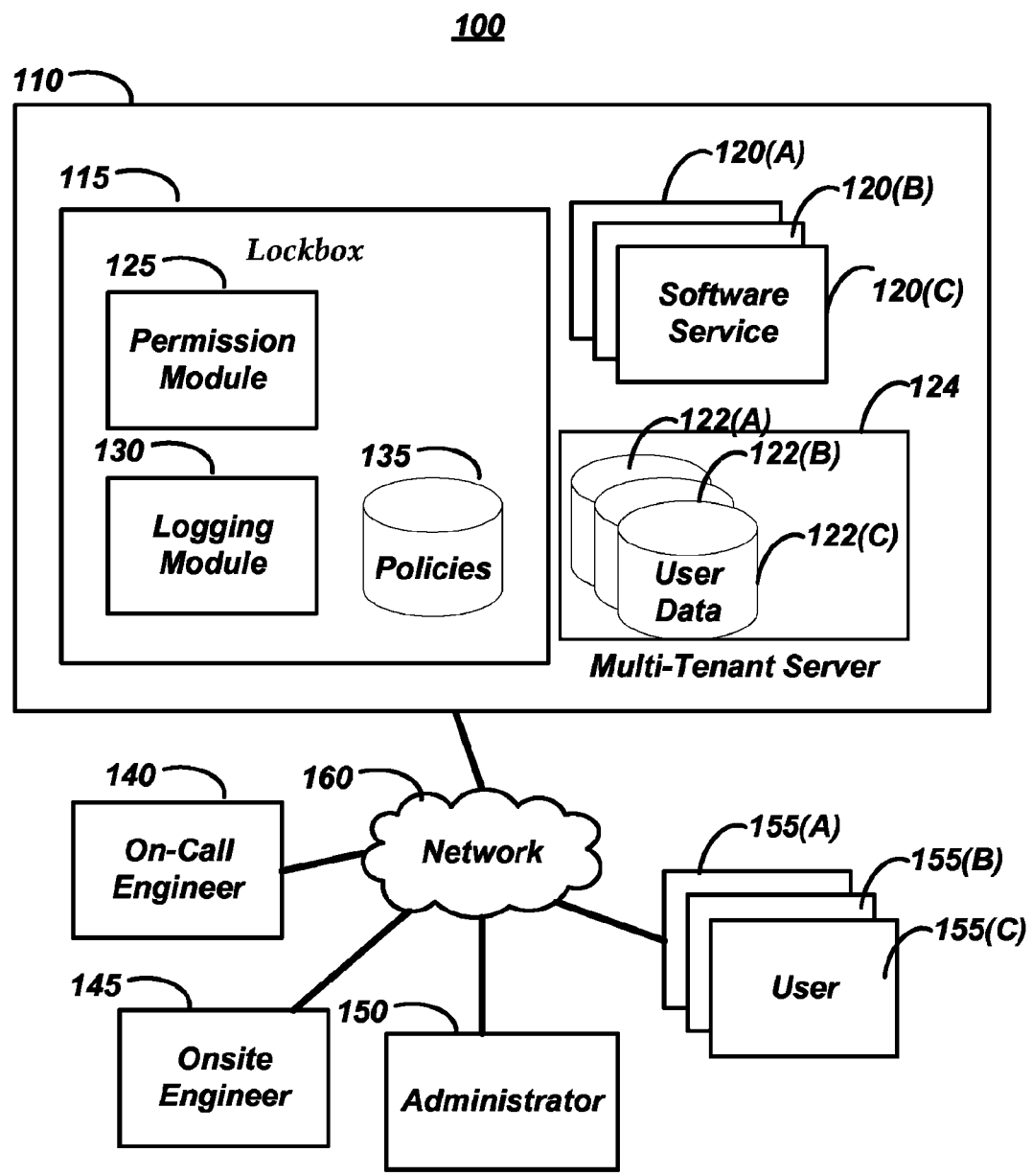
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Large scale system operation may be provided. Administrative access to systems used to provide cloud services may be regulate to ensure that there are no unauthorized access or exposure to the customer generated data. Furthermore, full auditing and reporting of all administrator activity and/or access may be provided. Such access management may be fully automated to grant, monitor, revoke and report access based on the needs of operating a large scale service and/or a complex on-premise system.

By default, everyone who has access to operate the service, debug issues, and/or respond to escalations and incidents in the system may be provided configuration view only permissions. Nobody in the system may belong to a full administrator and/or other elevated permissions security group. When an elevated access is needed, as when making a change in the system as a corrective action and/or to do invasive debugging of customer specific issues, the user may be expected to submit a request to an on-demand elevation system such as a lockbox.

The lockbox may evaluate the role of the requestor and the role group that they are requesting access to with a set of pre-defined policies. The lockbox may then make a decision either to automatically elevate and/or request explicit approval from an approval body as dictated by the policies. During elevation, the lockbox may stamp an attribute in the user object with an expiry time based on a requested interval. This lockbox may automatically de-elevate at a configured interval by default. The lockbox policies may also allow for elevation for a requested period of time. A de-elevate component of the lockbox may execute at configurable intervals looking for folks to be de-elevated.

All the activity on elevation requests may be audited and monitored. The lockbox may grant permissions at a granular level that segregates the duties and ensures that malicious activity can't happen. For example, those with permissions to change a configuration that is potentially exposing customer data do not have permissions to wipe off the audit trail of such change. The lockbox may monitor account usage and automatically disables user accounts inactive accounts and/or accounts associated with users who no longer have rights to access the services system.

FIG. 1 is a block diagram of an operating environment 100 for large scale system operation comprising a server 110. Server 110 may comprise a lockbox component 115, a plurality of hosted software services 120(A)-(C) and a plurality of user data storage components 122(A)-(C) associated with a multi-tenant application server 124. Server 110 may be operative to execute a plurality of other applications and/or services (not shown). Lockbox component 115 may comprise a permission module 125, a logging/auditing module 130, and a plurality of permission policies 135. Server 110 may be operative to communicate with a plurality of users such as an on-call engineer 140, an onsite engineer 145, and administrator 150, and/or a plurality of users 155(A)-(C) of software services 120(A)-(C). The users may access server 110 via a network 160 using, for example, an electronic communications device such as a computer, laptop, cellular and/or IP phone, tablet, game console and/or other device.

Figure 2:
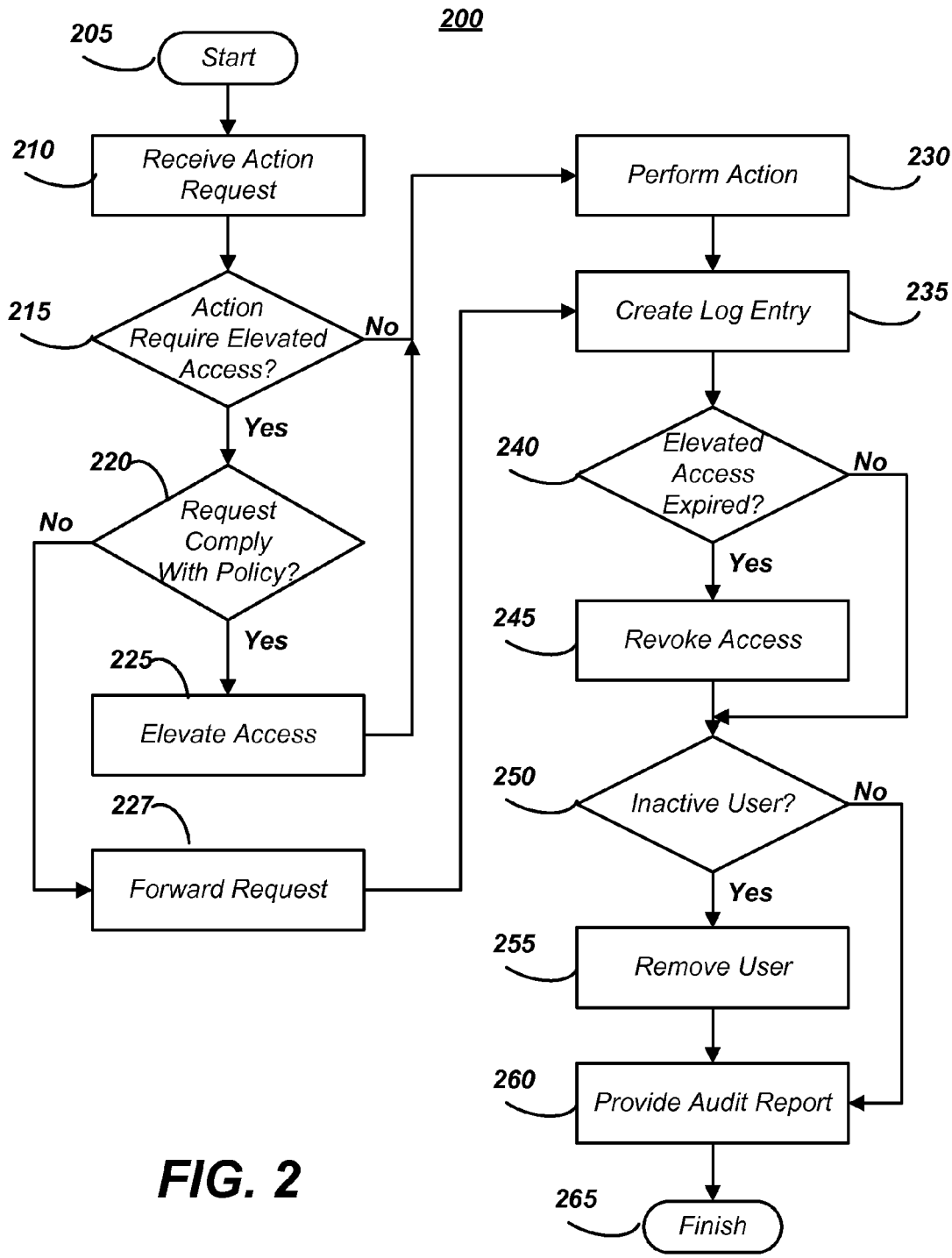
FIG. 2 is a flow chart of a method for providing large scale system operation.

FIG. 2 is a flow chart setting forth the general stages involved in a method 200 consistent with an embodiment of the invention for providing large scale system operation. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may receive an action request from a user. For example, on-call engineer 140 may attempt to run a debugging trace on a process associated with software service 120(A). To protect the privacy of user data 122(A), such access may not be always available to operators and/or engineers associated with server 110. Such users may be limited to basic access permissions, such as viewing log data and/or configuration information, and access to user data 122(A)-(C) is prohibited.

Method 200 may then advance to stage 215 where computing device 300 may determine whether the requested action requires an elevated permission. For example, on-call engineer 140 may have basic permission to view a log entry, but restarting software service 120(B) may require an elevated permission.

In response to determining that the requested action requires the elevated permission, method 200 may advance to stage 220 where computing device 300 may determine whether the action request complies with at least one of a plurality of permission policies associated with a lockbox service. For example, the requested action may be forwarded to lockbox component 115 and checked for compliance with at least one permission policy of plurality of permission policies 135 by permission module 125. Such policies may comprise checks for factors such as a user group criterion, a security flag criterion, an action scope criterion, and a schedule criterion. For example, a user may belong to an "onsite" user group that allows greater automated elevation of permissions that a user accessing server 110 from offsite.

Method 200 may then advance to stage 225 where computing device 300 may grant the elevated permission to the user. For example, lockbox component 115 may elevate the permissions allocated to on-call engineer 140 in order to allow the requested action to be performed. This elevation may be for a limited duration, that may be defined, for example, by the permission policy, by a configuration setting associated with the software service, and/or by a configuration setting associated with the at least one user group. Such permissions may comprise a set of permissions associated with a task, such as the need to modify overall configuration data for server 110 and restart several core services (e.g., network and/or user management services) in order to install a new software service into production.

If the action request is determined not to comply with the permission policies, method 200 may advance to stage 227 where computing device 300 may forward the action request to at least one approval user. For example, lockbox component 115 may forward the request to administrator 150 for review.

After elevating the access at stage 225, or if the requested action is determined not to need elevated access at stage 215, method 200 may advance to stage 230 where computing device 300 may perform the requested action. For example, on-call engineer 140 may be allowed to perform a debugging trace as allowed by the newly elevated permissions.

Method 200 may then advance to stage 235 where computing device 300 may create a log entry of the action request. The log entry may comprise whether the request resulted in automatic approval of the permissions elevation at stage 225 and/or whether the request was sent for administrator approval at stage 227. The log entry may further comprise a record of data accessed by the requesting user while the elevated permissions were in force. Consistent with embodiments of the invention, users who receive elevated permissions that permit access to user data 122(A)-(C) may be denied, by policies 135, if they request an action to modify log entries associated with such access. Such denials may also be logged and/or forwarded to administrator 150.

Method 200 may advance to stage 240 where computing device 300 may determine whether any users currently granted at least one second elevated permission should have those permissions revoked. For example, policies 135 may define a configurable length of time that such elevations are to remain in effect.

In response to identifying a user that should have their elevated permission revoked, method 200 may advance to stage 245 where computing device 300 may revoke the elevated permission and/or restore the user to only basic level access.

After revoking the elevated permissions at stage 245, or if no users were found to need permissions revoked at stage 240, method 200 may advance to stage 250 where computing device 300 may detect whether any users should have all access revoked. For example, a user who has been inactive for a configurable length of time or a user who is no longer employed by an organization associated with operating multi-tenant server 110 may be identified as candidates for removal.

In response to determining that the identified user should be removed, such as where the user is no longer associated with one of software services 120(A)-(C), method 200 may advance to stage 255 where computing device 300 may remove the user's access. For example, the user may be removed from the basic level user group and may have their access, including the ability to request actions, revoked.

Method 200 may then advance to stage 260 where computing device 300 may provide an audit report. For example, administrator 150 may be provided with an audit report comprising a list of all users who have been granted elevated permissions that allow access to user data 122(A)-(C). Method 200 may then end at stage 265.

An embodiment consistent with the invention may comprise a system for providing large scale system operation. The system may comprise a memory storage and a processing unit coupled to the memory storage. The processing unit may be operative to receive an action request from a user, determine whether the user requires elevated permissions to perform the action request, and in response to determining that the user requires elevated permissions to perform the action request, forward the action request to a lockbox and receive a permission response from the lockbox. In response to determining that the permission response comprises the approval, the processing unit may be operative to grant the user temporary elevated permission to perform the requested action. The permission response may be the result of the processing unit applying one of a plurality of permission policies that may each comprise a plurality of pre-defined evaluation rules, such as a rule associated with the user's role and/or user group membership (e.g., an onsite and/or on-call operator), an expiration rule (e.g., how long an elevated permission may persist), a security flag rules (e.g., whether the user's account indicates that the user has undergone a security clearance and/or background check), and an action request evaluation rule that may determine whether the requested action violates a privacy policy (e.g., denying elevations that may allow the user to modify a log entry associated with their own actions.)

Another embodiment consistent with the invention may comprise a system for providing large scale system operation. The system may comprise a memory storage and a processing unit coupled to the memory storage. The processing unit may be operative to receive an action request requiring an elevated permission from a user and determine whether the action request complies with at least one of a plurality of permission policies. In response to determining that the action request complies with the at least one of the plurality of permission policies, the processing unit may be operative to grant the user an elevated permission to perform the requested action. Otherwise, the processing unit may be operative to forward the action request to at least one approval user. The processing unit may be further operative to provide an audit report comprising a plurality of log entries associated with requested actions from various users. The granted elevated permissions may comprise, for example, a set of permissions for various actions associated with a task such as deploying a new software service to production on a cloud server.

Yet another embodiment consistent with the invention may comprise a system for providing large scale system operation. The system may comprise a memory storage and a processing unit coupled to the memory storage. The processing unit may be operative to receive an action request from a user and determine whether the requested action requires an elevated permission. In response to determining that the requested action requires the elevated permission, the processing unit may be operative to determine whether the action request complies with at least one of a plurality of permission policies associated with a lockbox service and, if not, forward the action request to at least one approval user. Otherwise, the processing unit may be operative to grant the elevated permission to the user for a limited duration, perform the requested action, and create a log entry associated with the user and the requested action. The processing unit may be further operative to periodically determine whether any users currently granted elevated permissions should have those elevated permissions revoked, such as after an expiration time defined by one of the permission policies and, if so, revoke the elevated permissions. The processing unit may be further operative to periodically detect whether any users are no longer associated with the at least one software service, such as where an operator is moved to a new project and/or leaves the organization associated with supporting the software service and, if so, remove the at least one third user from the at least one user group. The processing unit may also be operative to provide an audit report comprising a plurality of log entries associated with a plurality of requested actions.

Figure 3:
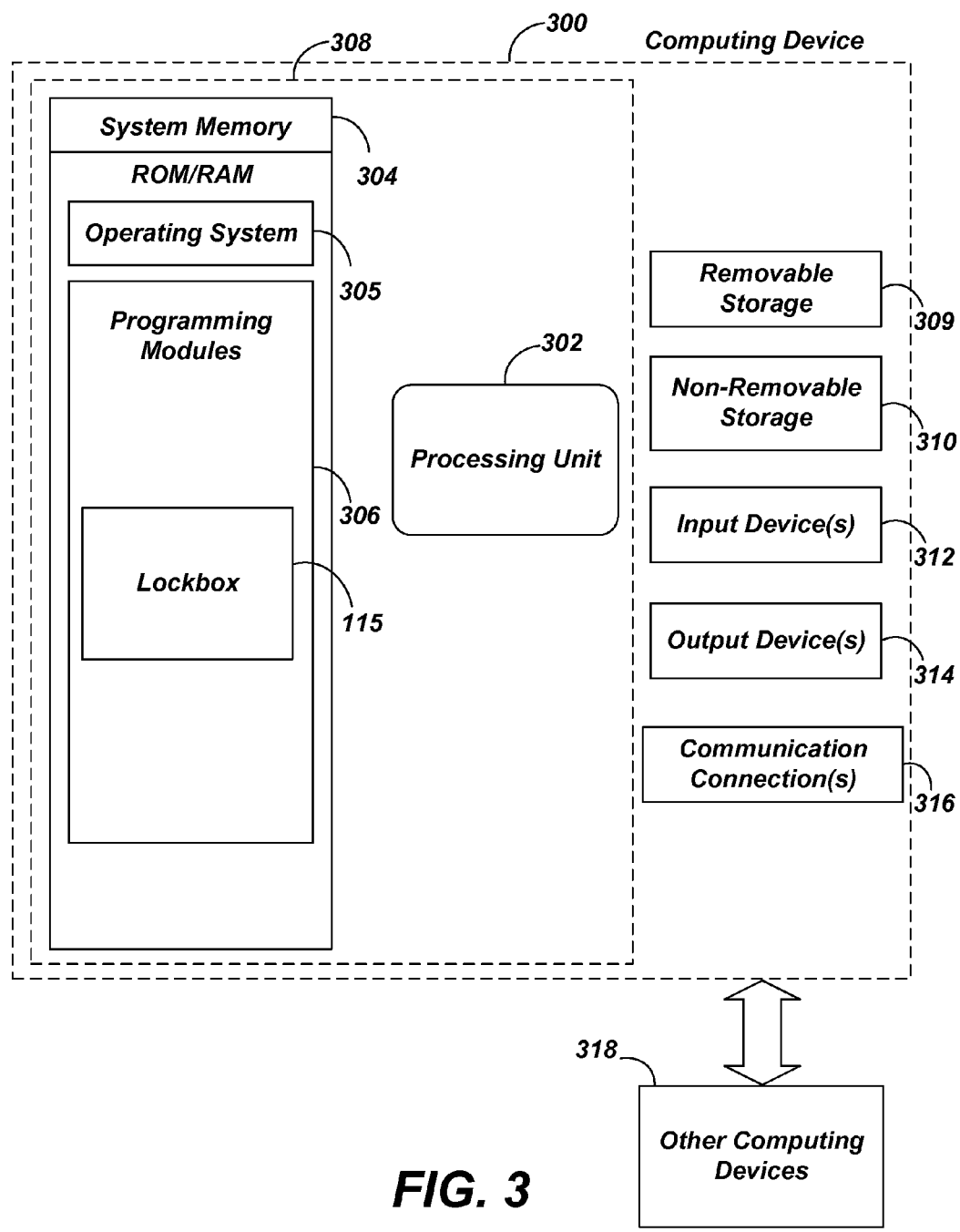
FIG. 3 is a block diagram of a computing device.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 3 and the associated descriptions provide a discussion of a variety of operating environments in which embodiments of the invention may be practiced. However, the devices and systems illustrated and discussed with respect to FIG. 3 are for purposes of example and illustration and are not limiting of a vast number of computing device configurations that may be utilized for practicing embodiments of the invention, described herein.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include lockbox component 115. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, a capture device, etc. A capture device may be operative to record a user and capture spoken words, motions and/or gestures made by the user, such as with a camera and/or microphone. The capture device may comprise any speech and/or motion detection device capable of detecting the speech and/or actions of the user. For example, the capture device may comprise a Microsoft® Kinect® motion capture device comprising a plurality of cameras and a plurality of microphones. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 may perform processes and/or methods as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method implemented by a computing device for providing large scale system operation, the method comprising:
   receiving an action request from a user;
   determining, by the computing device, whether the user requires elevated permissions to perform the action request;
   in response to determining that the user requires elevated permissions to perform the action request, forwarding the action request to a lockbox; and
   receiving a permission response from the lockbox, wherein receiving the permission response from the lockbox comprises:
      determining, by the lockbox, a current role and a requested role of the user;
      determining whether elevation to the requested role from the current role complies with at least one of a plurality of policies associated with the lockbox; wherein the at least one of the plurality of policies determines whether the user belongs to a specific user group; wherein the specific user group comprises at least one of: an administrator group, a security clearance group, an on-call group, and an onsite group; and wherein determining whether the elevation complies with the at least one of the plurality of policies comprises checking an action request scope evaluation rule to determine whether the action request violates a privacy policy; and
      providing, in response to determining that the elevation to the requested role complies with the at least one of the plurality of policies and that the action request does not violate the privacy policy, the permission response, wherein providing the permission response further comprises stamping an attribute in a user object with an expiry time of the granted elevated permissions; and
   determining, by the computing device at a configurable interval, whether any of the granted elevated permissions should be revoked, and
   revoking at least one of the granted elevated permissions based on the determination of at least one of the following: the user is no longer associated with an organization, expiration of the expiry time, and inactivity for a predetermined length of time.

2. The method of claim 1, further comprising:
   determining whether the permission response comprises an approval; and
   in response to determining that the permission response comprises the approval, granting the user temporary elevated permission to perform the action request.

3. The method of claim 2, further comprising:
   determining whether a pre-configured interval has elapsed since receiving the permission response from the lockbox; and
   in response to determining that the pre-configured interval has elapsed since receiving the permission response from the lockbox, revoking the temporary elevated permission from the user.

4. The method of claim 1, further comprising:
   in response to determining that the action request complies with the at least one of the plurality of policies, providing the permission response comprising an approval.

5. The method of claim 1, further comprising:
   in response to determining that the action request does not comply with the at least one of the plurality of policies, forwarding the action request to at least one approval user.

6. The method of claim 1, wherein the at least one of the plurality of policies comprises one of a plurality of predefined permission elevation policies.

7. The method of claim 1, wherein the at least one of the plurality of policies comprises a user role evaluation rule.

8. The method of claim 1, wherein the at least one of the plurality of policies comprises a permission elevation expiration rule.

9. The method of claim 1, wherein the at least one of the plurality of policies comprises an action request denial rule.

10. The method of claim 1, further comprising:
    checking a user group membership rule, wherein checking the user group membership rule comprises determining whether the user is an on-site operator or an off-site operator and
    checking a security flag rule, wherein checking the security flag rule comprises determining whether the user has undergone a security clearance.

11. A system for providing large scale system operation, the system comprising:
    a memory storage; and
    a processing unit coupled to the memory storage, wherein the processing unit is operable to:
       receive an action request requiring an elevated permission from a user;
       communicate with a lockbox, wherein the lockbox segregates duties associated with a action request;
       determine whether the action request complies with at least one of a plurality of permission policies, wherein at least one of the plurality of permission policies determines whether the user is associated with a security flag, the determining comprising the processing unit operable to:
          determine a current role and a requested role of the user, and
          evaluate whether elevation from the current role to the requested role complies with the at least one of the plurality of permission policies by checking at least an action request scope evaluation rule to determine whether the action request violates a privacy policy;

in response to determining that the action request complies with the at least one of the plurality of permission policies, grant the user an elevated permission to perform a requested action for a temporary period and stamp an attribute in a user object with an expiry time marking an end of the temporary period;

when the granted elevated permission to perform the requested action grants the user access to user data:
  log the user's activity associated with the action request in at least one log entry,
  receive a request to modify the at least one log entry,
  deny the request to modify the at least one log entry,
  log the denial of the request to modify the at least one log entry, and
  determine, at a configurable interval, whether any of the granted elevated permissions should be revoked, and
  revoke at least one of the granted elevated permissions based on the determination of at least one of the following: the user is no longer associated with an organization, expiration of the expiry time, and inactivity for a predetermined length of time.

12. The system of claim 11, wherein the configurable time interval comprises a pre-define interval upon a manual request.

13. The system of claim 11, wherein the at least one of the plurality of permission policies determines whether the user belongs to a specific user group.

14. The system of claim 13, wherein the specific user group comprises at least one of the following: an administrator group, a security clearance group, an on-call group, and an onsite group.

15. The system of claim 11, wherein the processing unit is further operative to create a log entry comprising the user, the action request, and the granted elevated permissions.

16. The system of claim 15, wherein the processing unit is further operative to create at least one second log entry associated with at least one second action request received from the user while the user is associated with the granted elevated permissions.

17. The system of claim 16, wherein the processing unit is further operative to provide an audit report comprising a plurality of log entries.

18. The system of claim 11, wherein the elevated permission comprises a set of permissions associated with a task.

19. The system of claim 11, wherein the at least one of the plurality of permissions policies comprises a permission elevation expiration rule defining the expiry time.

20. A computer-readable storage device which stores a set of instructions which when executed performs a method for providing large scale system operation, the method executed by the set of instructions comprising:

receiving an action request from a user, wherein the user is associated with at least one user group comprising basic access permissions to at least one software service, and wherein the basic access permissions prohibit access to a plurality of user data associated with the at least one software service;

determining whether the action request requires an elevated permission;

in response to determining that the action request requires the elevated permission:

providing a lockbox, wherein the lockbox segregates duties associated with the requested action, determining whether the action request complies with at least one of a plurality of permission policies associated with a lockbox service, wherein the plurality of permission policies comprise at least one of the following: a user group criterion, a security flag criterion, an action scope criterion, and a schedule criterion, and wherein determining whether the action request complies with at least one of the plurality of permission policies comprises:

determining a current role and a requested role of the user; and determining whether elevation from the current role to the requested role complies with the plurality of permission policies by checking at least the action request scope criterion to determine whether the action request violates a privacy policy;

in response to determining that the action request complies with the at least one of a plurality of permission policies, granting the elevated permission to the user for a limited duration, wherein the limited duration is defined by at least one of the following: the at least one permission policy, a configuration setting associated with the software service, and a configuration setting associated with the at least one user group, wherein granting the elevated permission for the limited duration further comprises stamping an attribute in a user object with an expiry time marking an end of the limited duration;

permitting the user to perform the requested action; and creating a log entry associated with the user and the requested action.

* * * * *